US008914817B2

(12) United States Patent
Seok et al.

(10) Patent No.: US 8,914,817 B2
(45) Date of Patent: Dec. 16, 2014

(54) PROGRESSIVE VIDEO STREAMING APPARATUS AND METHOD BASED ON VISUAL PERCEPTION

(71) Applicant: Electronics and Telecommunications Research Institute, Daejeon (KR)

(72) Inventors: Joo Myoung Seok, Daejeon (KR); Ji Hun Cha, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 23 days.

(21) Appl. No.: 13/713,083

(22) Filed: Dec. 13, 2012

(65) Prior Publication Data
US 2013/0156407 A1 Jun. 20, 2013

(30) Foreign Application Priority Data

Dec. 15, 2011 (KR) ........................ 10-2011-0135189

(51) Int. Cl.
H04H 60/33 (2008.01)
H04N 5/76 (2006.01)
H04N 5/783 (2006.01)
H04N 9/79 (2006.01)
H04N 21/442 (2011.01)
H04N 21/6587 (2011.01)
H04N 5/765 (2006.01)

(52) U.S. Cl.
CPC .................. H04N 5/76 (2013.01); H04N 5/783 (2013.01); H04N 9/7921 (2013.01); H04N 21/44218 (2013.01); H04N 21/6587 (2013.01); H04N 5/765 (2013.01)
USPC .............. 725/10; 386/230; 386/239; 386/248

(58) Field of Classification Search
USPC ......... 386/230, 235, 282, 289, 343, 239, 248; 725/10, 9; 707/705; 463/36
See application file for complete search history.

(56) References Cited

U.S. PATENT DOCUMENTS

| 6,163,336 A * | 12/2000 | Richards .......................... 348/42 |
| 2005/0281531 A1 * | 12/2005 | Unmehopa ..................... 386/46 |
| 2006/0280445 A1 * | 12/2006 | Masaki et al. .................. 386/95 |
| 2010/0107184 A1 * | 4/2010 | Shintani .......................... 725/10 |
| 2010/0209074 A1 * | 8/2010 | Kondo et al. .................... 386/68 |
| 2011/0063440 A1 * | 3/2011 | Neustaedter et al. ......... 348/143 |
| 2012/0295708 A1 * | 11/2012 | Hernandez-Abrego et al. ............................... 463/36 |
| 2013/0117248 A1 * | 5/2013 | Bhogal et al. ................. 707/705 |

FOREIGN PATENT DOCUMENTS

| KR | 1020070000925 A | 1/2007 |
| KR | 1020070027803 A | 3/2007 |
| KR | 1020100092248 A | 8/2010 |

* cited by examiner

Primary Examiner — Thai Tran
Assistant Examiner — Mishawn Dunn
(74) Attorney, Agent, or Firm — Ladas & Parry LLP

(57) ABSTRACT

A progressive video streaming apparatus and method based on a visual perception are provided, and the progressive video streaming apparatus may include a gaze detector to detect gaze information including at least one of a location of a focus and a viewing angle of a user, a video playback quality determiner to determine video playback quality layers, based on the detected gaze information, a progressive streaming receiver to request video data and receive the video data, using a visual perception priority based on the detected gaze information, and a visual perception-based player to play back the received video data, by controlling an interactive delay to be reduced below a selected criterion, while reducing a visually recognized quality change in the received video data below another selected criterion.

11 Claims, 5 Drawing Sheets

PROGRESSIVE VIDEO STREAMING APPARATUS AND METHOD BASED ON VISUAL PERCEPTION

CROSS-REFERENCE TO RELATED APPLICATION

This application claims the benefit of Korean Patent Application No. 10-2011-0135189, filed on Dec. 15, 2011, in the Korean Intellectual Property Office, the disclosure of which is incorporated herein by reference.

BACKGROUND

1. Field of the Invention

The present invention relates to a streaming playback apparatus and method that may minimize dissatisfaction with a service experienced by the user due to an interactive delay that occurs in a trick mode used in an interactive video service.

2. Description of the Related Art

A service enabling viewing of high quality video using a communication network having a bidirectional communication characteristic, for example an Internet protocol television (IPTV), and a video on demand (VoD), is widely used. In such a service, to enable a user to view a multi-view by changing a channel or by selecting a screen, or to view a panoramic video having a wide view angle in all directions in a limited screen size, data received by an interactive video streaming method may be played back. In this instance, the data may be played back in a spatial and temporal trick mode.

In this instance, a user may be dissatisfied with a service, due to an interactive delay caused by a high bit rate of a high quality video, a characteristic of a transmission channel, a compression encoding method, and the like.

In addition, when a user desires to receive a quick response, dissatisfaction with the interactive delay may further increase.

Recently, to minimize the interactive delay, a technology of reducing the interactive delay by simultaneously transmitting channels that are not currently viewed, for example a broadcasting scheme, is being proposed.

In addition, technologies of reducing dissatisfaction with a service due to a delay by transmitting an advertisement, or by separately providing additional information during a delay time are being proposed.

In particular, to prevent a bandwidth from being unnecessarily wasted when different channels are simultaneously transmitted, technologies of lowering a quality of an image, transmitting the image, quickly changing a channel preferentially when the channel is selected, receiving the quality of the image and playing back the image are being used.

Additionally, since only a preference channel selected is transmitted using a user's channel viewing history, a method of reducing a bandwidth waste is used, however, the bandwidth has been unnecessarily wasted. As a quality of a video increases, as a number of channels and a number of image screens increase, and as a view angle of an image widens, the bandwidth may be further wasted proportionally.

When images transmitted simultaneously preferentially provided when a channel is quickly changed have low qualities, dissatisfaction with an interactive delay may be reduced. However, dissatisfaction with a video quality may be increased, and as a result dissatisfaction with a service may not be reduced. Additionally, a method of providing additional information may also enable a user to be dissatisfied with a service, based on a propensity of the user.

SUMMARY

According to an aspect of the present invention, there is provided a progressive video streaming apparatus based on a visual perception, the progressive video streaming apparatus including: a gaze detector to detect gaze information including at least one of a location of a focus and a viewing angle of a user; a video playback quality determiner to determine video playback quality layers, based on the detected gaze information; a progressive streaming receiver to request video data and receive the video data, using a visual perception priority based on the detected gaze information; and a visual perception-based player to play back the received video data, by controlling an interactive delay to be reduced below a selected criterion, while reducing a visually recognized quality change in the received video data below another selected criterion.

The interactive delay may be computed by adding at least one of a packetizing delay time, a network delay time, a group-of-pictures (GOP) delay time, and a buffering delay time.

The progressive streaming receiver may transmit, first, video data with a high priority based on a visual perception sensitivity of a user, and may enable a playback order to be determined based on the visual perception sensitivity.

The video playback quality determiner may equalize a visual perception cutoff function based on a spatial frequency to an average spatial frequency, based on a size of a slice determined by a number of horizontal pixels, and may determine the video playback quality layers.

The video playback quality determiner may select a video quality layer with a minimum difference with the average spatial frequency based on a maximum spatial frequency included in each video quality layer, and may determine the video playback quality layers.

According to another aspect of the present invention, there is provided a progressive video streaming method based on a visual perception, the progressive video streaming method including: detecting gaze information including at least one of a location of a focus and a viewing angle of a user; determining video playback quality layers, based on the detected gaze information; requesting video data and receiving the video data, using a visual perception priority based on the detected gaze information; and playing back the received video data, by controlling an interactive delay to be reduced below a selected criterion, while reducing a visually recognized quality change in the received video data below another selected criterion.

The requesting may include transmitting, first, video data with a high priority based on a visual perception sensitivity of a user, and enabling a playback order to be determined based on the visual perception sensitivity.

The determining may include equalizing a visual perception cutoff function based on a spatial frequency to an average spatial frequency, based on a size of a slice determined by a number of horizontal pixels, and determining the video playback quality layers.

The determining may include selecting a video quality layer with a minimum difference with the average spatial frequency based on a maximum spatial frequency included in each video quality layer, and determining the video playback quality layers.

EFFECT

According to an embodiment of the present invention, it is possible to reduce dissatisfaction with a service experienced by a user due to an interactive delay that occurs in a trick mode used in an interactive video service.

Additionally, according to an embodiment of the present invention, it is possible to prevent a reduction in a video quality and a transmission delay that a user experiences, through a progressive streaming method.

Furthermore, according to an embodiment of the present invention, it is possible to prevent a bandwidth from being wasted in proportion to an increase in a number of channels, and the like.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
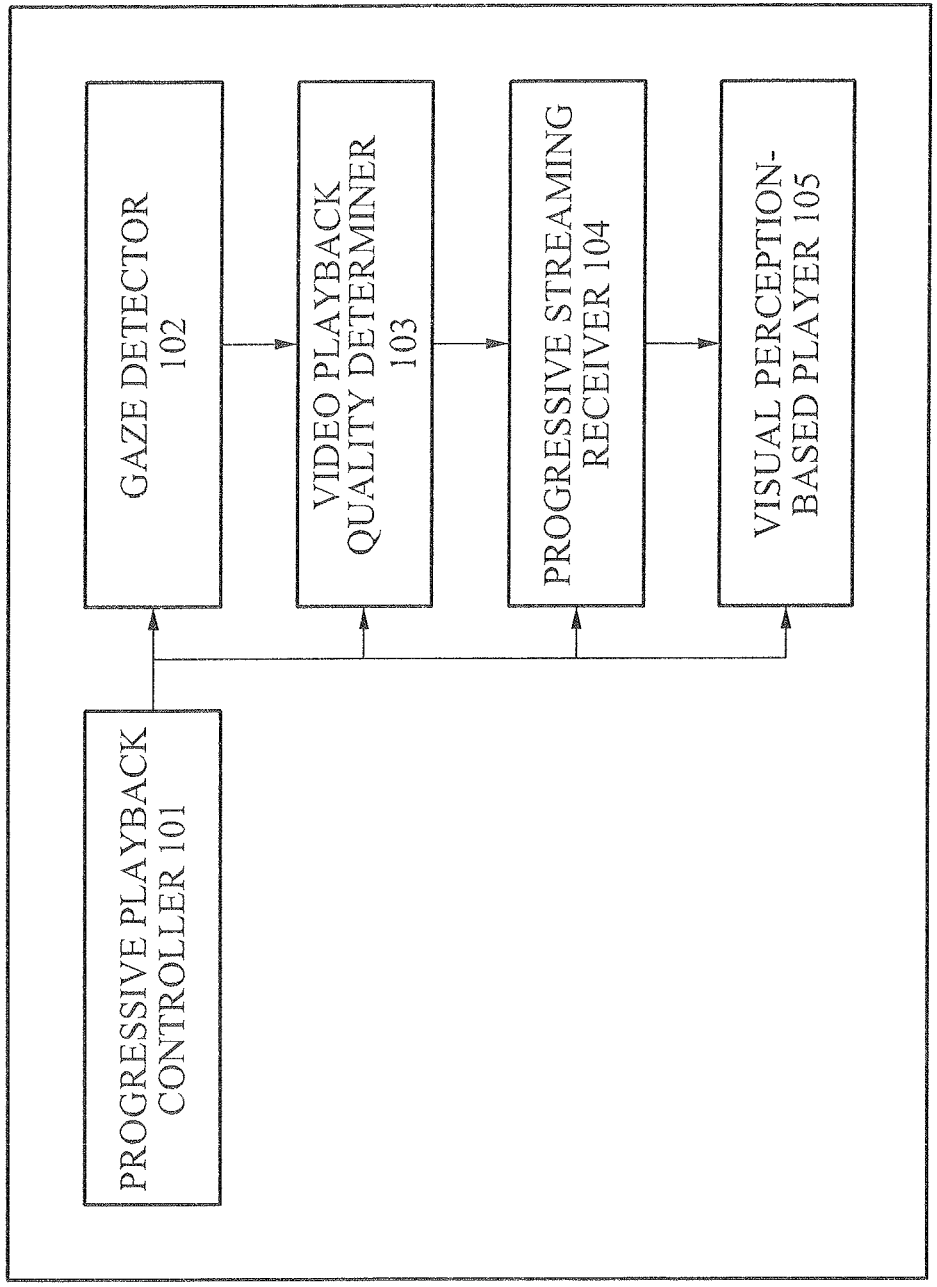
FIG. 1 is a block diagram illustrating a progressive video streaming apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a progressive video streaming apparatus 100 according to an embodiment of the present invention.

When the progressive video streaming apparatus 100 is used, data corresponding to a video quality that is visually recognized may be transmitted, based on a user's viewing distance, a location of a focus generated when a user stares at a screen to select a screen and to change a channel, and the like.

Additionally, a reduction in a video quality and a transmission delay that a user experiences may be minimized through a progressive streaming method of gradually receiving video data based on a priority of a visual sensitivity, and of playing back the received video data. In the visual sensitivity, a video quality discernment may decrease as a distance from a center of the focus increases.

Furthermore, when the progressive video streaming apparatus 100 is used, a problem of a conventional method in which a bandwidth is wasted in proportion to an increase in a number of channels may be overcome.

The progressive video streaming apparatus 100 may include a progressive playback controller 101, a gaze detector 102, a video playback quality determiner 103, a progressive streaming receiver 104, and a visual perception-based player 105.

The progressive playback controller 101 may control or manage all functions of the gaze detector 102, the video playback quality determiner 103, the progressive streaming receiver 104, and the visual perception-based player 105.

The gaze detector 102 may detect gaze information including at least one of a location of a focus and a viewing angle of a user.

A key of interactive video streaming may be a receiving apparatus of receiving video based on interaction according to a user's intention, and of playing back the received video.

A configuration for progressive streaming playback based on visual perception may detect gaze information using the gaze detector 102, by tracking a user's eyes or by directly selecting a location of a focus of interest, and the like, based on a user's viewing environment, such as a screen size, a viewing distance, and the like, and may derive a location of a focus and a viewing angle of a user.

The video playback quality determiner 103 may determine video playback quality layers, based on the detected gaze information.

In other words, the video playback quality determiner 103 may utilize video encoding information, and may determine video playback quality layers, to select only a recognizable video quality according to a change in a visual recognizability, based on the derived viewing angle, the derived location of the focus, and the viewing environment, and to play back a video with the selected video quality.

The progressive streaming receiver 104 may request video data and receive the video data, using a visual perception priority based on the detected gaze information.

In other words, the progressive streaming receiver 104 may request video data selected based on the viewing distance and the location of the focus, using the visual perception priority, and may receive the requested video data.

The visual perception-based player 105 may play back the received video data, by controlling an interactive delay to be reduced below a selected criterion, while reducing a visually recognized quality change in the received video data below another selected criterion.

In other words, the visual perception-based player 105 may start a fast playback of the received video data based on visual perception, may continuously adjust the quality change based on a perception quality in response to a change in a viewing environment, and may play back the received video data.

The progressive video streaming apparatus 100 may minimize an interactive delay, and may improve a bandwidth usage efficiency, while maintaining a minimum change in video quality recognized by people.

Figure 2:
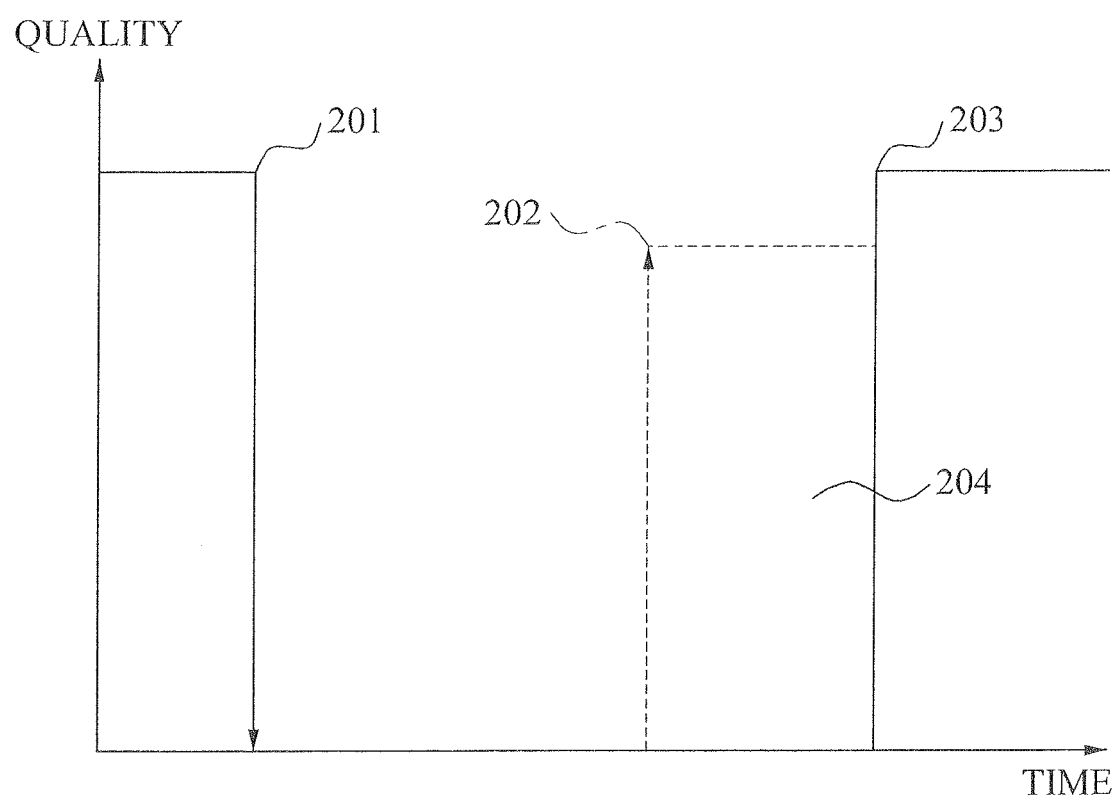
FIG. 2 is a graph illustrating a buffering delay caused by video data buffering after an initial interactive request.

FIG. 2 is a graph illustrating a buffering delay caused by video data buffering after an initial interactive request.

An interactive delay may be expressed as a sum of a packetizing delay time, a network delay time, a group-of-pictures (GOP) delay time, and a buffering delay time. In the packetizing delay time, a streaming server may packetize corresponding video data, after an initial interactive request 201. In the network delay time, video data may be transmitted via a network. The GOP delay time may be required to wait for an intraframe in a broadcast environment in a GOP structure that needs to be received from the intraframe due to an encoding reference relationship. The buffering delay time may be caused by video data buffering to alleviate a change in a network jitter, or to provide a data reception error restoration time.

In the present invention, to minimize an interactive delay time, video data with a high priority based on a visual perception sensitivity varying depending on a user's viewing distance and a location of a focus may be transmitted first, and the video data may be quickly played back from a location of a focus with a high visual perception sensitivity in operation 202. Accordingly, in the present invention, the video data may be played back more quickly than a service completion playback time 203 of a conventional method in which playback is started only when all video data are received, and thus an effect 204 of reducing an interactive delay may be provided.

When an order of video data is determined by giving priority to visual perception, video data may be selected using visual recognizability based on a viewing location or a location of a focus generated when a user stares at a screen. Accordingly, it may be difficult to visually recognize a quality change.

Figure 3:
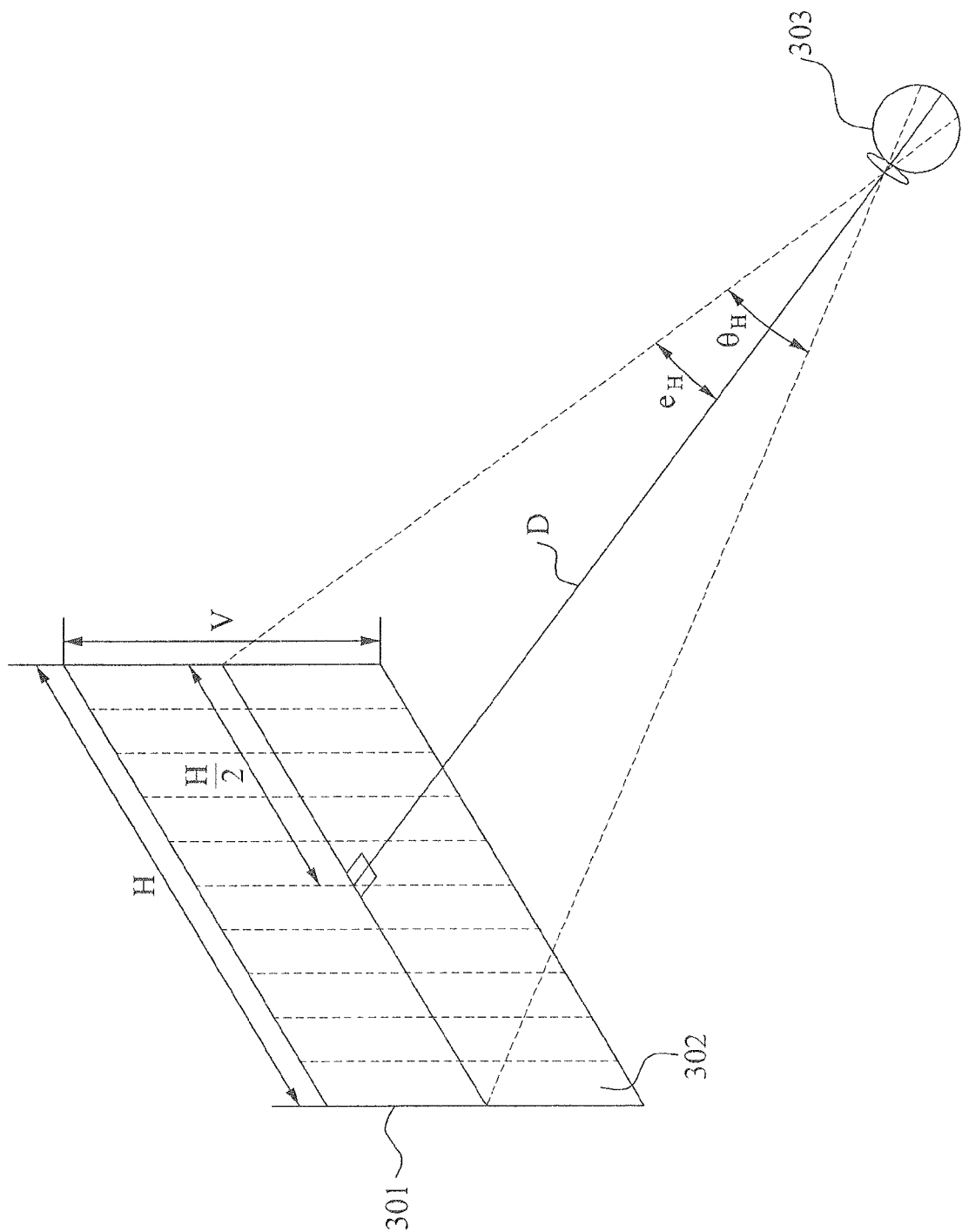
FIGS. 3 and 4 are diagrams illustrating an interactive video streaming viewing environment according to an embodiment of the present invention.
Figure 4:
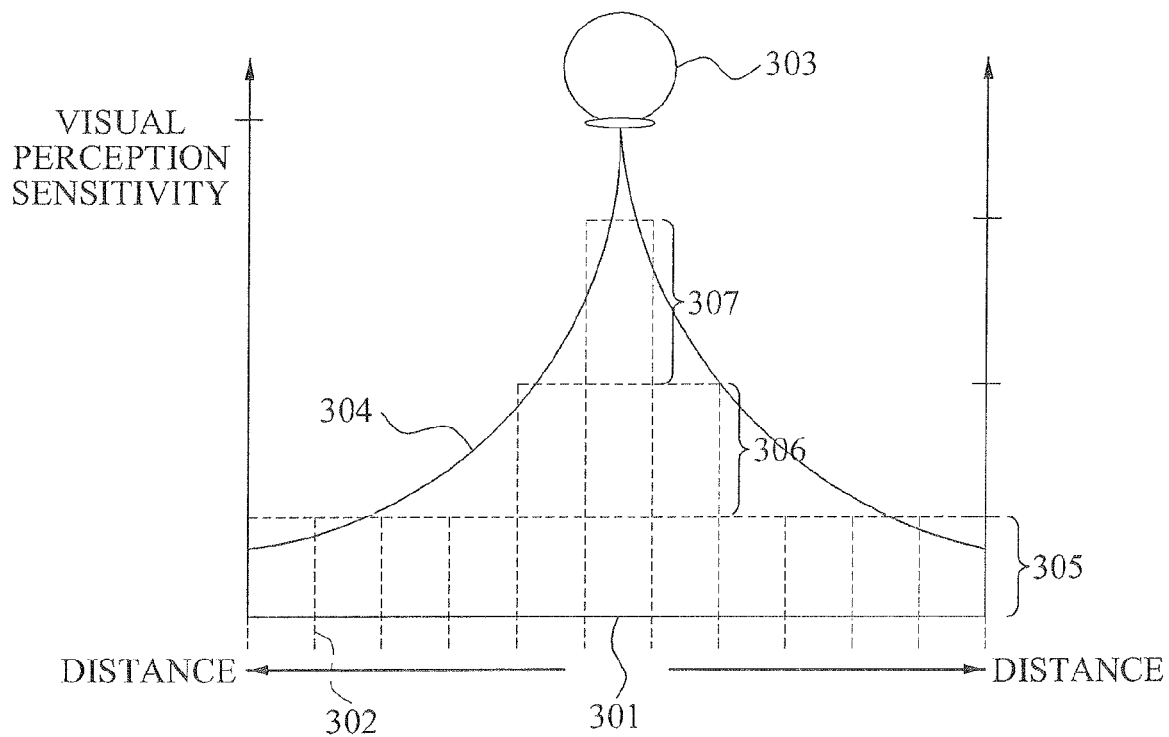
Figure 4:
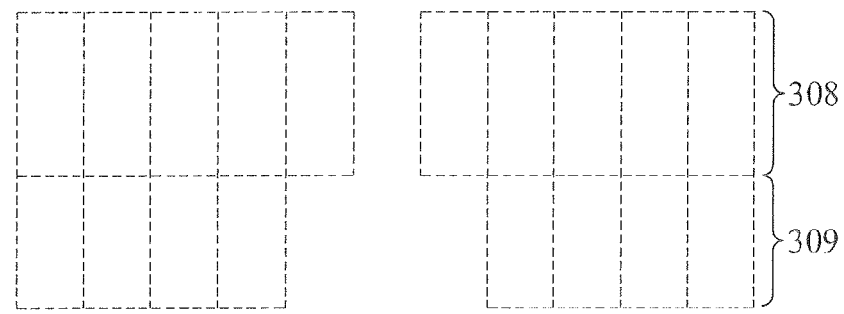

FIGS. 3 and 4 are diagrams illustrating an interactive video streaming viewing environment according to an embodiment of the present invention.

As shown in FIG. 3, a size of a screen 301, and a viewing distance D may be used as important elements to analyze a viewing environment in which a user 303 views.

The size of the screen 301 may be defined by a horizontal size H, and a vertical size V. The viewing distance D may be typically represented by a multiple of the vertical size V, for example 'D=d*V'.

A viewing angle $e_H$ based on the size of the screen 301 (H and V) and the viewing distance D may be computed using the following Equation 1:

$$\theta_{H,radians} = 2\arctan\left(\frac{H}{2d*V}\right) = 2\arctan\left(\frac{H}{2D}\right), \quad [\text{Equation 1}]$$

$$\theta_H = \frac{\theta_{H,radians}}{\pi/180}$$

In this instance, a degree in which visual recognizability is reduced in a range of a center of a focus to a specific point or to both ends of a screen, may be defined to be an eccentricity e (degrees). For example, when a change in perception is considered based on a horizontal axis, $e=e_H$, and $$e_H = \frac{\theta_H}{2}.$$

For example, when a vertical axis is used as a criterion, e may be defined to be $e_v$ ($e=e_v$). When screens have the same size, $e_H$ may be changed based on the viewing distance D. In other words, as the viewing distance D decreases, $e_H$ may increase.

In an example of a camera, a diagonal line may be used as a criterion. Considering a characteristic of visual perception based on a horizontal axis and a vertical axis, the same change in the characteristic of visual perception is shown. Accordingly, for understanding of the present invention, description will be made based on the horizontal axis.

When a center of a focus ($e_H=0$) is placed in a center as shown in FIG. 4, based on the horizontal axis, the visual recognizability may decrease as a distance from the focus to ends of a screen decreases ($e_H>0$). To adjust a video quality for each horizontal location of a pixel in which a visual perception sensitivity is reduced, an image of frames forming a single screen may need to be encoded in a unit of a vertical slice 302, so that the image may be played back with various qualities. This will be further described with reference to FIG. 4.

Based on previous studies that it is difficult to visually discern a spatial frequency of at least 60 cycle per degree (cpd) as a number of frequencies that is visually analyzed during visual perception, and a viewing distance suitable for a screen size and a resolution (namely, a video quality) may be obtained in a side, and whether an optimum video quality is good in a fixed viewing distance may be determined.

In other words, a spatial frequency discerned by a maximum vision based on a normal vision may correspond to 60 cpd. When a single cycle is assumed to be two pixels based on a Nyquist sampling theorem, and when a full high-definition television (HDTV) has typically a viewing angle of 30° to 33°, for example 32°, an optimum image resolution may be '32°×60 pixels', and a resolution with 1920 horizontal pixels may be computed.

Since a ratio of a width to a length of a currently serviced HD image is '16:9', 1080 pixels may be obtained by multiplying 1920 pixels by '9/16'. For example, when a provided resolution is computed based on visual recognizability of 60 cpd, a digital cinema 4K resolution that doubles the full HDTV may be recognized in the same viewing distance. It may be difficult to visually distinguish resolutions higher than the digital cinema 4K resolution.

The screen size may be important to determine an optimum viewing distance. When a screen size is 40 inches in diagonal measurement by a viewing angle calculation method, about 1.6 meters (m) may be obtained as an optimum viewing distance for an image with a 1080 p resolution, about 2.4 m may be obtained as an optimum viewing distance for an image with a 720 p resolution, and about 4.8 m may be obtained as an optimum viewing distance for an image with a 480 p resolution. For example, when a user views an image at 2.4 m, playback of a 1080 p image may not be required, since eyes of people may not determine whether an image quality is 1080 p or 720 p.

Thus, in the present invention, it is possible to further minimize unnecessary waste of resources, by taking into consideration an optimum resolution based on a viewing distance.

Since a resolving power of a visually recognized spatial frequency decreases, as a distance from a center of a focus increases, as described above, the visual perception sensitivity may be reduced. The visually recognizable spatial frequency may correspond to a visual perception cutoff function $f_{s\_cutoff}$ 304 of FIG. 3, and may be represented as given in the following Equation 2, based on previous studies:

$$f_{s\_cutoff} = \frac{e_2 \ln(1/CT_0)}{(e_H + e_2)\alpha} \quad (cpd) \quad [\text{Equation 2}]$$

In Equation 2, $CT_0$ denotes a minimal contrast threshold, and $\alpha$ denotes a spatial frequency decay constant.

Additionally, $e_2$ denotes a half-resolution eccentricity. Values of $\alpha$, $e_2$, and $CT_0$ may be interpreted to be '0.106', '2.3', and '1/64', respectively, based on a previous experiment result, and may vary depending on an experimental environment.

To select a quality of video data corresponding to a visually recognized video quality, a hierarchical simulcast encoding method may be required.

As described in FIG. 3, to select data and a video quality adaptively based on the horizontal axis and the visual perception, an entire frame may need to be divided into slices, based on a location of a pixel, and each of the slices, namely each video data, may need to be encoded with various qualities. Accordingly, it is possible to provide an optimum quality suitable for a change in a cutoff spatial frequency based on a location of a focus. In this instance, the slices may be encoded by a method provided by an existing standard codec, and a size of each of the slices may have a high correlation with a size of a macroblock of video coding, and may vary. Thus, in the present invention, a size of a slice may be selected as a smallest unit in a video encoding specification, and the like. Since a single virtual slice may be formed by at least one actual slice when a service is provided, a size of a slice may be flexibly defined.

As shown in FIG. 3, video data may form the screen 301 using the vertical slices 302, and may have various qualities for each of the vertical slices 302. For example, qualities may be classified into a basic quality, an intermediate quality, and a high quality, and a quality close to a visual perception cutoff function corresponding to a location of each of the vertical slices 302 may be selected, and accordingly selection of a video quality based on visual perception may be optimized.

For a progressive video streaming method of the present invention, video data 305, 306, and 307 suitable for the visual perception cutoff function may be transferred first, and may be enabled to be quickly played back. Subsequently, additionally required video data 308 and 309 may be transferred. Accordingly, providing of an original quality may be prepared.

In an example of fast channel switching, only the video data 305, 306, and 307 may be played back, and a current channel may be switched to another channel. Accordingly, playback of the video data 308 and 309 that are not visually recognized may not be required.

In addition, when a location of a focus remains unchanged, a service may be provided, since a quality change is not recognized by only the video data 305, 306, and 307 that are received first. However, when a corresponding screen is viewed, the location of the focus may be changed, and accordingly preparing for the change in the location of the focus by transferring all video qualities may be suitable for an actual service providing environment. Thus, a target service scenario may be applied.

In a method of selecting a video quality layer as described above, $f_{s\_cutoff}$ may be equalized to $f_{avg}$ based on a size of a slice determined by a number of horizontal pixels, and a video quality layer l with a minimum difference with $f_{avg}$ based on a maximum spatial frequency $F_l$ included in each video quality layer.

The method may be used to optimize a change in visual perception, and $f_{s\_cutoff}$ and $f_{avg}$ may be identical, as the size of the slice decreases. However, the video quality layer l may be associated with a characteristic of video encoding. The above operation may be repeated a same number of times as a maximum number of slices (h) of a single frame, and a video quality layer may be selected based on the change in the visual perception in a single screen.

$$\text{argmin}|F_l - f_{avg,i}|_{\text{subject } F_l \geq f_{avg,i}} i=0,1,2,\ldots,h-1$$

For example, when a user views a full HDTV image with a resolution of '1920×1080' on a 40-inch screen, in a viewing distance of 1.6 m, as described in FIG. 3, a maximum spatial frequency of 30 cpd may be provided. When the maximum spatial frequency is matched to $f_{s\_cutoff}$ or $f_{avg}$, and when an image quality of 720 p and 480 p are provided based on a spatial hierarchical encoding method, spatial frequencies for each layer may be assumed to be 20 cpd, and 10 cpd. There is a difference based on a degree of movement of an object in an image, and long and short distance, however, this relates to a spatial frequency extraction problem of a corresponding location.

Figure 5:
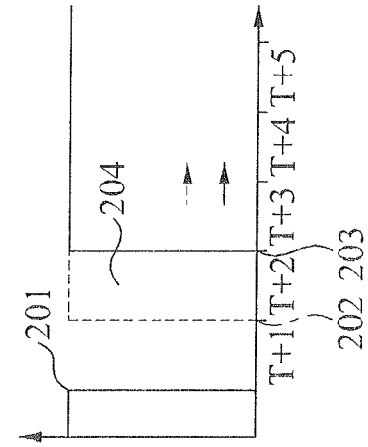
FIG. 5 is a diagram illustrating a progressive playback method for minimizing a visual perception-based interactive delay.
Figure 5:
Figure 5:
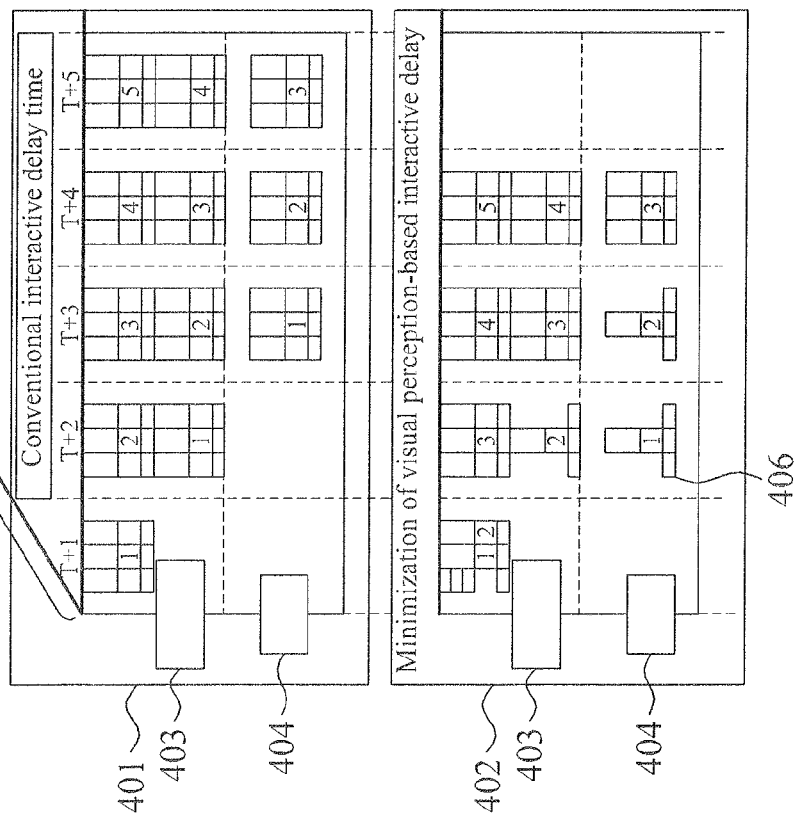

FIG. 5 is a diagram illustrating a progressive playback method for minimizing a visual perception-based interactive delay.

As shown in FIG. 5, in a conventional method 401, when video data 405 of two seconds is assumed to be buffered in operation 403, when an interactive request 201 occurs, a predetermined amount of received video data may be buffered in operation 203 to a time 'T+2' after a time T elapses in operation 202, and corresponding video data may be played back in a time 'T+3' in operations 204 and 404. In this instance, the time T may be obtained by adding a packetizing delay time and a network delay time.

In the present invention 402, after the same time T elapses, only video data matched to visual perception may be selected and transmitted. Accordingly, a delay time may be reduced to T−Δ, and the video data may be transmitted in the same bandwidth. For example, video data of two seconds may be received in a time 'T+1', and may be played back in the time 'T+2'. A quality of a video played back in the time 'T+2' may differ from the original quality of the video, however, a change in a video quality may not be recognized, since the video is played back based on a visual perception sensitivity according to a viewing environment. Accordingly, by using less video data 406, a visual perception quality may be maintained, and a small amount of bandwidth may be used, and thus it is possible to minimize an interactive delay.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A progressive video streaming apparatus based on a visual perception, the progressive video streaming apparatus comprising:
   a gaze detector to detect gaze information including at least one of a location of a focus and a viewing angle of a user;
   a video playback quality determiner to determine video playback quality layers, based on the detected gaze information;
   a progressive streaming receiver to request video data and receive the video data, using a visual perception priority based on the detected gaze information; and a visual perception-based player to play back the received video data, by controlling an interactive delay to be reduced below a selected criterion, while reducing a visually recognized quality change in the received video data below another selected criterion, wherein the progressive streaming receiver transmits, first, video data with a high priority based on a visual perception sensitivity of a user, and enables a playback order to be determined based on a visual perception sensitivity.

2. The progressive video streaming apparatus of claim 1, wherein the interactive delay is computed by adding at least one of a packetizing delay time, a network delay time, and a group-of-pictures (GOP) delay time, and a buffering delay time.

3. The progressive video streaming apparatus of claim 1, wherein the video playback quality determiner equalizes a visual perception cutoff function based on a spatial frequency to an average spatial frequency, based on a size of a slice determined by a number of horizontal pixels, and determines the video playback quality layers.

4. The progressive video streaming apparatus of claim 3, wherein the video playback quality determiner selects a video quality layer with a minimum difference with the average spatial frequency based on a maximum spatial frequency included in each video quality layer, and determines the video playback quality layers.

5. A progressive video streaming method based on a visual perception, the progressive video streaming method comprising:
   detecting gaze information including at least one of a location of a focus and a viewing angle of a user;
   determining video playback quality layers, based on the detected gaze information;
   requesting video data and receiving the video data, using a visual perception priority based on the detected gaze information; and
   playing back the received video data by controlling an interactive delay to be reduced below a selected criterion, while reducing a visually recognized quality change in the received video data below another selected criterion, wherein the determining comprises equalizing a visual perception cutoff function based on a spatial frequency to an average spatial frequency, based on a size of a slice determined by a number of horizontal pixels, and determining the video playback quality layers.

6. The progressive video streaming method of claim 5, wherein the interactive delay is computed by adding at least one of a packetizing delay time, a network delay time, and a group-of-pictures (GOP) delay time.

7. The progressive video streaming method of claim 5, wherein the requesting comprises transmitting, first, video data with a high priority based on a visual perception sensitivity of a user, and enabling a playback order to be determined based on the visual perception sensitivity,
   wherein the video data is played back with an original image quality when a predetermined period of time elapses.

8. The progressive video streaming method of claim 5, wherein the determining comprises selecting a video quality layer with a minimum difference with the average spatial frequency based on a maximum spatial frequency included in each video quality layer, and determining the video playback quality layers.

9. A progressive video streaming apparatus based on a visual perception, the progressive video streaming apparatus comprising:
   a gaze detector to detect gaze information including at least one of a location of a focus and a viewing angle of a user;
   a video playback quality determiner to determine video playback quality layers, based on the detected gaze information; and
   a progressive streaming receiver to request video data and receive the video data, using a visual perception priority based on the detected gaze information,
   wherein the progressive streaming receiver transmits, first, video data with a high priority based on a visual perception sensitivity of a user, and enables a playback order to be determined based on the visual perception sensitivity.

10. The progressive video streaming apparatus of claim 9, wherein the video playback quality determiner equalizes a visual perception cutoff function based on a spatial frequency to an average spatial frequency, based on a size of a slice determined by a number of horizontal pixels, and determines the video playback quality layers.

11. The progressive video streaming apparatus of claim 10, wherein the video playback quality determiner selects a video quality layer with a minimum difference with the average spatial frequency based on a maximum spatial frequency included in each video quality layer, and determines the video playback quality layers.

* * * * *